H. H. TAYLOR.
VEHICLE WHEEL.
APPLICATION FILED JUNE 4, 1918.

1,345,281.

Patented June 29, 1920.

Inventor
Horace H. Taylor.

By Harry C. Schroeder
Attorney

UNITED STATES PATENT OFFICE.

HORACE H. TAYLOR, OF OAKLAND, CALIFORNIA.

VEHICLE-WHEEL.

1,345,281.　　　　Specification of Letters Patent.　　Patented June 29, 1920.

Application filed June 4, 1918. Serial No. 238,122.

*To all whom it may concern:*

Be it known that I, HORACE H. TAYLOR, citizen of the United States, residing at Oakland, in the county of Alameda and State of California, have invented certain new and useful Improvements in Vehicle-Wheels, of which the following is a specification.

This invention is an improved automobile tire.

The object of this invention is to so incorporate blocks of wood with the rubber of an automobile tire as to decrease the wear on the rubber, and reduce the first cost of the tire.

Another object of the invention is to so place the wooden blocks as to reduce the possibility of slippage.

Referring to the drawing.

Figure 1:
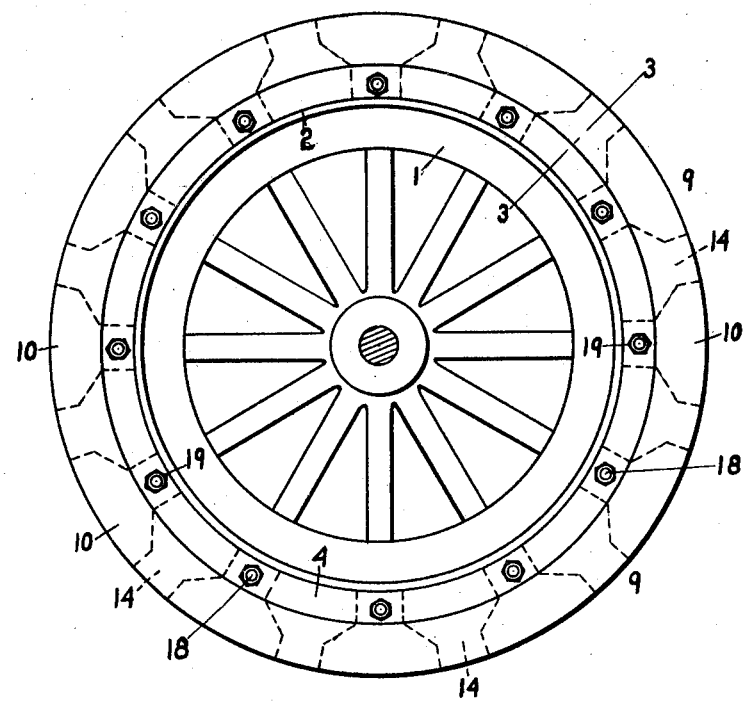
Figure 1 is a side elevation of the tire installed on an automobile wheel.
Figure 2:
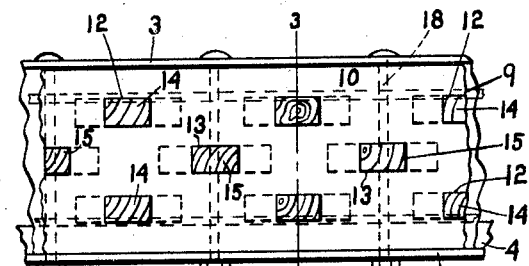
Fig. 2 is a top plan view of a part of the tire.
Figure 3:
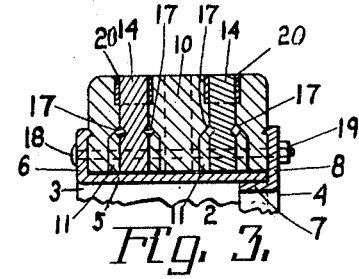
Fig. 3 is a section taken on the line 3—3 in Figs. 1 and 2.
Figure 4:
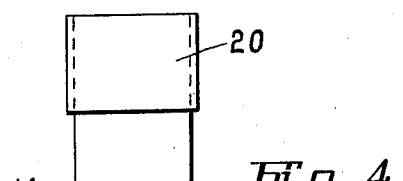
Fig. 4 is an end elevation on an alined scale of one of the wooden blocks.

In the drawing 1 indicates the felly of an automobile wheel and 2 the wheel rim mounted on said felly. Said rim is formed with two annular members 3 and 4. The member 3 has a transverse flange 5 and an outside outwardly extending flange 6. The member 4 has a transverse flange 7 adapted to fit within flange 5 and an outside outwardly extending flange 8 adapted to engage the inner end of flange 5. My tire 9 fits in the rim 2 upon the flange 5 between flanges 6 and 8. The tire has a rubber body 10 provided with a pair of inner annular grooves 11. The body 10 is also provided with two rows of slots 12 and a center row of slots 13 arranged between the rows of slots 12 in staggered relation thereto. The slots 12 extend radially through the body 10 from the grooves 11 and the slots 13 extend radially all the way through said body. The cross sectional area of the outer portion of the slots 12 and 13 is about one-third of the cross sectional area of the inner portion of said slots, and said outer slot portion is arranged midway between the end walls of the inner larger portion of the slots. The end walls of said slots converge from their inner larger portion to their outer small portion. Wood blocks 14 and 15 fit respectively in the slots 12 and 13 and rest upon the rim 2, said blocks having converging sides which engage the converging end walls of slots 12 and 13 thus serving to prevent said blocks from falling out of said slots. The blocks are cut so that the grain extends from end to end of the blocks, thus presenting the grain endwise to the surface of the road. The blocks 14 are provided with right-angular notches 16 in their sides which rest within the inner walls of the grooves 11 and into which snap annular rings 17 which are preferably square in cross section, said rings engaging the inner walls of said grooves, thus holding the blocks firmly in position in the body of the tire. The grooves 11 are filled with rubber which is vulcanized therein after the blocks 14 have been properly placed in the tire body and the rings 17 have been placed in the grooves 11 and snapped into the notches 16 in said blocks thus sealing the rings and blocks in position in the tire body. Bolts 18 extend through the flange 6, tire body 10, blocks 15 and flange 8 and a nut 19 screws on the end of the bolt 8 against flange 8, thus holding the tire on the rim between flanges 6 and 8 and holding the blocks 15 in the tire body. Metal bands 20 surround the outer ends of the blocks 14 and 15 and prevent splintering of the outer ends of the blocks. The blocks are treated with a water-proof material before they are placed in the tire to resist moisture and the weather. The blocks 14 and 15 constitute substantially one-half of the body of the tire, thus providing a tire of substantially one-half rubber and one-half wood. The blocks 14 and 15 are spaced closely together, thus providing a maximum number of blocks in the tire. The blocks are closely spaced in such manner as to provide a maximum number of small area block treads, and to distribute the weight equally on the blocks and rubber of the tire. The blocks stand the concussion against the tread of the tire and take the wear, thus serving as a support for the rubber. The blocks may be replaced as desired. The structure of the tire gives it great durability and tread traction.

Having described my invention, I claim as new and desire to secure by Letters Patent:

1. A tire including an elastic annular body provided with annular inner grooves, and slots extending from said grooves through the periphery of the tire, blocks extending through said grooves and slots, said blocks being provided with notches and key rings extending around in said grooves and engaging said notches for holding said blocks in position.

2. A tire including an elastic annular body provided with annular inner grooves and slots extending from said grooves through the periphery of the body, blocks extending through said grooves and said slots, said blocks being provided with angular notches and key rings extending around in said grooves and engaging said notches to hold the blocks in position.

3. A tire including an elastic body, two rows of blocks detachably mounted in said body, a center row of blocks in said body, and means for detachably bolting said center row of blocks in said body.

4. A tire including an elastic annular body provided with annular inner grooves, and slots extending from said grooves through the periphery of the tire, blocks extending through said grooves and slots, said blocks being provided with notches and key rings extending around in said grooves and engaging said notches for holding said blocks in position, said grooves being filled with a filling and said filling vulcanized therein with the blocks and rings therein.

5. In combination with a wheel rim, an elastic annular tire body fitting upon said rim, said body being provided with a plurality of rows of slots, blocks fitting in said slots, bolts extending through the rim flanges, said body and through the intermediate row of blocks, and means for holding the other blocks in said body.

In testimony whereof I affix my signature.

HORACE H. TAYLOR.